April 15, 1958     E. WILDHABER     2,830,834
METHOD AND APPARATUS FOR FINISHING TOOTHED FACE COUPLINGS
AND THE LIKE, AND TOOTHED FACE COUPLING
Filed May 16, 1955     5 Sheets-Sheet 1

*INVENTOR:*

Ernest Wildhaber

INVENTOR:

Ernest Wildhaber

April 15, 1958 E. WILDHABER 2,830,834
METHOD AND APPARATUS FOR FINISHING TOOTHED FACE COUPLINGS
AND THE LIKE, AND TOOTHED FACE COUPLING
Filed May 16, 1955 5 Sheets-Sheet 3

*INVENTOR:*

Ernest Wildhaber

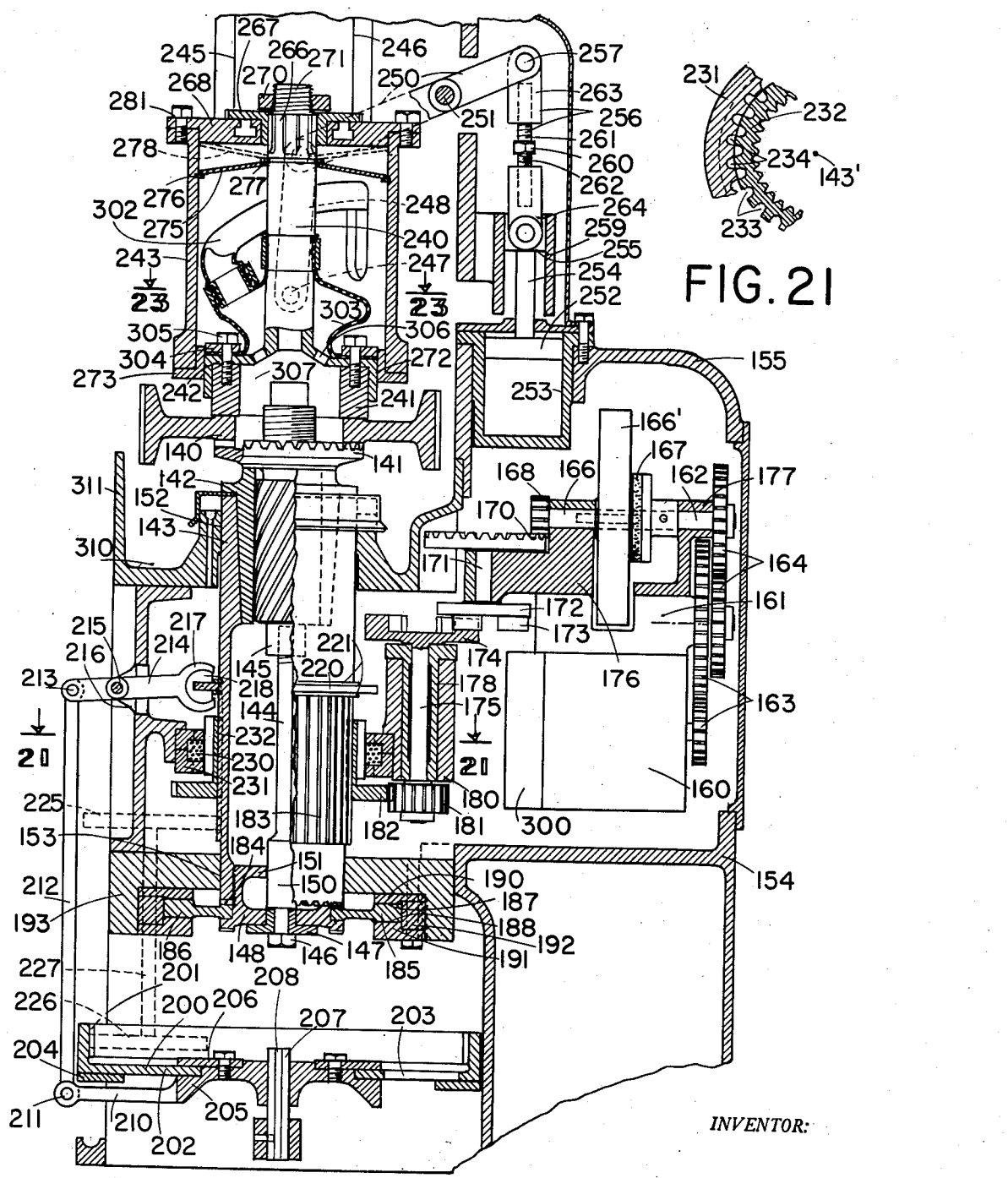

April 15, 1958  E. WILDHABER  2,830,834
METHOD AND APPARATUS FOR FINISHING TOOTHED FACE COUPLINGS
AND THE LIKE, AND TOOTHED FACE COUPLING
Filed May 16, 1955  5 Sheets-Sheet 5

*INVENTOR:*

*Ernest Wildhaber*

United States Patent Office 2,830,834
Patented Apr. 15, 1958

2,830,834

METHOD AND APPARATUS FOR FINISHING TOOTHED FACE COUPLINGS AND THE LIKE, AND TOOTHED FACE COUPLING

Ernest Wildhaber, Brighton, N. Y.

Application May 16, 1955, Serial No. 508,432

26 Claims. (Cl. 287—103)

The present invention relates to improvements in methods and apparatus for finishing toothed face couplings, and to the tooth shape of face couplings. It applies especially to the production and design of toothed face couplings whose teeth are equispaced about an axis and have a constant lengthwise profile in parallel planes perpendicular to said axis. Particularly it applies to coupling teeth having helical or approximately helical tooth surfaces.

One object is to devise a finishing process and a process of improving the side tooth surfaces of face couplings of the character referred to, that produces teeth of high uniformity and practically without spacing errors.

A further object is to devise a process of finishing face couplings having helical or approximately helical tooth surfaces, in which the tooth surfaces of mating coupling members are adapted to each other and made to fit each other, and where the tooth surfaces of each coupling member are equalized.

Another aim is to devise a process as stated, which in addition to its accuracy is also very fast and efficient, so that the production cost is low.

A further object is to devise an accurate and efficient process of finishing face couplings by abrasion while avoiding local heating, so that heat cracks are entirely avoided.

More specifically a lapping process for toothed face couplings shall be devised, in which the two members of a toothed face coupling are lapped together in coaxial position and with their teeth in simultaneous contact, by turning the two members relatively to each other on their common axis and effecting relative reciprocation along said axis, whereby said turning motion comes to a stand-still momentarily in the full-depth position.

Also a finishing process and especially a lapping process shall be devised, in which one side of the teeth of a coupling member are engaged while moving towards full-depth position and in which the other side of the teeth are engaged while moving away from full-depth position, and in which relative indexing between a coupling member and the part engaged thereby is effected after every stroke to full-depth position.

Another aim is to devise a lapping process between mating face coupling members, in which the lapping action is confined to a region less than two thirds of the working depth to reduce distortion, and where said region includes a full-depth position.

A further object is to devise a suitable apparatus or machine to carry out this method, and to devise an apparatus in which the drive applied is in the form of a turning motion at a varying rate, and the reciprocation required is derived from said turning motion.

A further aim is to devise an apparatus for lapping toothed face couplings in a rapid relative turning and reciprocatory motion, in which mass-balance is provided both for the varying turning motion and the reciprocatory motion. A further object is to devise an apparatus in which the varying kinetic energy required is supplied at least in part by a member designed for the purpose, so that the energy supplied by the motor varies less than the kinetic energy of the parts.

The present finishing or improving process is so effective that new coupling designs may be made, with advantage. One of these designs is a toothed face coupling of the fixed type, for rigidly connecting two parts or two shafts. In accordance with my invention the two coupling members of a pair contain straight teeth that have helical side surfaces, and are held in tight engagement by threaded means. With the present invention such tooth surfaces can now be produced with highest accuracy at low cost. An added attraction is the larger freedom of design. Thus one of the coupling members may be provided with a portion projecting beyond the face surface of its teeth, as there need be no clearance for a grinding wheel, even though the member is finished after hardening.

A further aim is to devise a fixed face coupling that permits the use of longer teeth than conventional design.

A still other object is to provide a tooth design for most favorable use of the novel method, with tooth surfaces relieved at the lower tooth flanks, so that at full-depth position the tooth tops reach beyond the region where relief starts on the mating teeth.

Other objects will appear in the course of the specification and from the recital of the claims.

These objects may be attained singly or in any combination.

In the drawings:

Fig. 3 is an axial section, partly a side view, of a face coupling rigidly connecting a gear rim with a shaft that has a threaded portion projecting beyond the extended end surface of its coupling teeth.

Fig. 4 is a fragmentary axial section, partly a view, of a face coupling rigidly connecting the hub of an adjustable propeller with a shaft that contains a projecting thread.

Fig. 5 is a fragmentary axial section of a differential and ring gear, illustrating a further application.

Fig. 6 is an axial section, partly a side view, of face couplings rigidly connecting a set of disks such as may be used in a jet engine. Here too one coupling member has a shaft projection not possible with conventional ground face couplings.

Fig. 20 is an axial section of a machine or apparatus constructed according to the present invention and adapted to carry out the novel method, the machine being cut off slightly at the top and bottom.

Fig. 21 is a fragmentary section taken along lines 21—21 of Fig. 20.

Figures 22, 25:
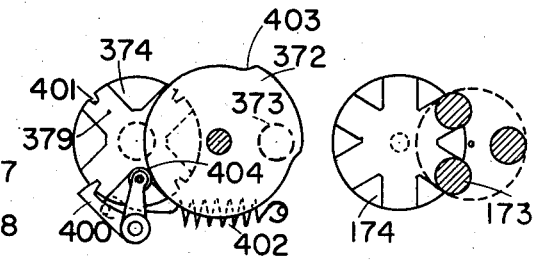
Fig. 22 is an end view of the Geneva wheel of Fig. 20, and a section through the operating pins, the section being taken at right angles to the axis of the Geneva wheel.
Figure 26:
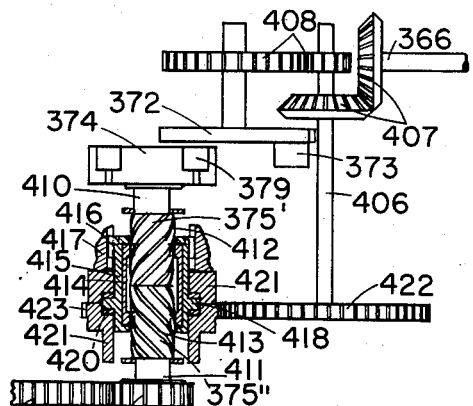
Figure 24:
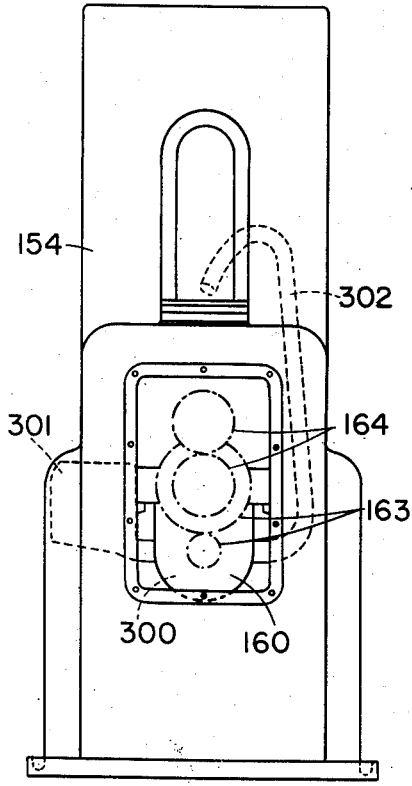
Fig. 24 is a rear view corresponding to Fig. 23.

Figures 25 and 26 refer to a modification. Fig. 25 is an end view of a Geneva wheel and locking pawl, together with its operating member; and Fig. 26 is a front view corresponding to Fig. 25 and further showing a modified drive arrangement.

Figure 27:
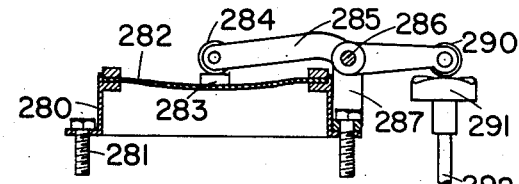

Fig. 27 is a diagrammatic view of an optional feature of the present invention.

Figure 28:
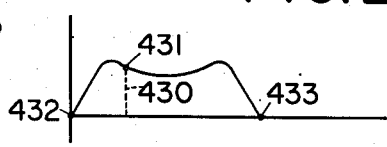

Fig. 28 is a velocity diagram of an indexing motion, in accordance with a modification.

Figure 29:
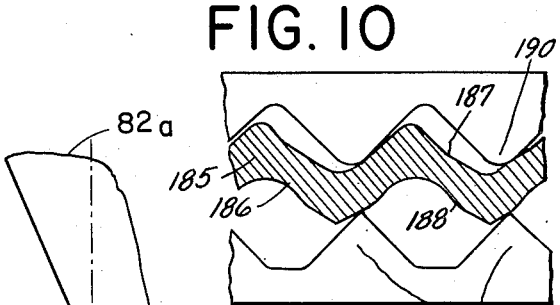

Fig. 29 is a fragmentary section on an enlarged scale of the master cam 185 shown in Fig. 20, and a side view of the cooperating stationary abutment members, the section being taken along a cylindrical surface coaxial with the cam adjacent the inner ends of its working surfaces; and said cylindrical surface being developed into a plane.

Figure 1:
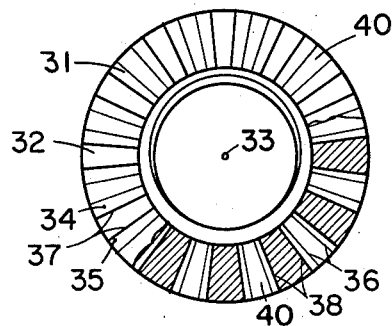
Fig. 1 is partly a plan view of one member of the fixed face coupling shown in Fig. 2, and partly a mean section taken perpendicular to its axis.
Figure 2:
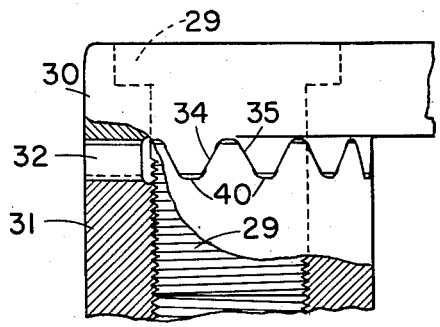
Fig. 2 is partly a side view and partly an axial section of a fixed face coupling constructed according to the present invention, and containing helical tooth sides held in tight engagement by threaded means.

In Figures 1 and 2 the numerals 30 and 31 denote the two members of a fixed face coupling containing straight teeth 32 that extend radially of their axis 33. The tooth sides 34, 35 are helical surfaces, such as may be described by a line moving along and turning about an axis (33) in direct proportion to the axial motion of said line. One such line is the radial line 38 of Fig. 1.

The coupling teeth 32 preferably have a constant depth from end to end of the teeth, as indicated in Fig. 2. A bolt 29 threads into member 31, and maintains the tooth sides 34, 35 in engagement under pressure.

The tooth profiles in cylindrical sections coaxial with the coupling are portions of helices of the same lead. The inclination of these helices to the axial direction increases with increasing distance from the coupling axis. Thus the profiles have inclinations or pressure angles which vary along the length of the teeth and increase toward the outside.

Due to this change of inclination along the teeth the root lines 36 of the teeth (Fig. 1) are inclined to the lines 37 at the tooth tops, and inclined to the mean longitudinal profiles 38 of the teeth. All these lines are radial lines intersecting the coupling axis 33.

With conventional plane tooth sides or with conventional conical tooth sides and teeth of constant depth the root lines would be parallel to the mean longitudinal profiles. The tooth bottoms 40 bounded by radial lines 36 therefore are less tapered than they would be with conventional tooth surfaces.

A cutting tool passing through the tooth spaces has to be narrower than the width of the tooth bottom at the inner inner end. Accordingly a wider tool can be used with tooth bottoms 40 than with conventional tooth bottoms, under otherwise equal conditions. Also a larger face width can be provided at a given width of the tool, so that a stronger coupling can be achieved.

My invention makes systematic use of the property of helical surfaces of staying in surface contact with mating helical surfaces when they are relatively displaced in axial direction and are turned on their axis to keep in contact. This property is made use of in the production.

No other surface retains surface contact with its mate when moved along and about the coupling axis relatively thereto. Thus conical tooth sides or plane tooth sides of the same means profile inclination can touch only at their outer ends when moved away from full-depth position.

A very important advantage of fixed couplings constructed according to the present invention and finished by abrasion after hardening is the absence of the restrictions applying to ground couplings. Thus projecting portions may be used which would be impossible with conventionally ground couplings.

Figures 3 to 6 show examples of my fixed couplings finished by abrasion after hardening.

Figure 3:
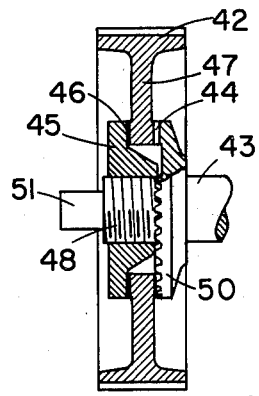
Figures 3 to 6 illustrate various new applications of fixed type face couplings accurately finished after hardening and containing projecting portions which would interfere with the conventional grinding wheels, but made possible with the present invention.

Gear 42, shown in Fig. 3, is rigidly connected to shaft 43 by a face coupling 44 that is kept in tight engagement by a nut 45. Nut 45 acts through a somewhat deformable ring 46 on a flange 47 of gear 42, and threads onto a projection 48 of shaft 43. Projection 48 reaches well beyond the level of the teeth of coupling member 50, that is beyond the extended face surface of its teeth. At its outer end the projection 48 contains a journal portion 51 with a cylindrical bearing surface. This could not be done with conventional grinding, with conventional finishing after hardening.

Figure 4:
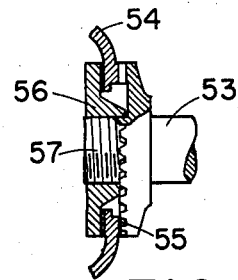

Fig. 4 illustrates a fixed coupling similar to the coupling shown in Fig. 3, but serving for very rigidly connecting an engine shaft 53 with the hollow hub 54 of a propeller with adjustable blades. The coupling 55 is maintained in engagement under pressure by a nut 56 threading onto a central projection 57 of shaft 53.

Figure 5:
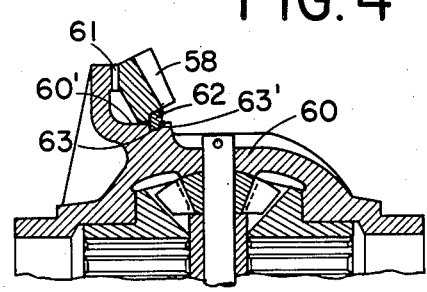

Fig. 5 illustrates a new way of securing a ring gear 58 of a rear axle to the differential carrier 60 by means of a face coupling 61 having helical tooth sides. The coupling is maintained in engagement under pressure by a ring 62 engaging a groove 63 provided on the carrier 60.

Ring 62 is rolled into groove 63 after the ring gear 58 is set in place. Before rolling, the inside surface of ring 62 matches the outside surface 60' of carrier 60. Rolling with a plurality of rollers compresses ring 62 and moves it into the groove 63.

If desired, a snap ring may be used in place of ring 62. The side 63' of groove 63 is then made slightly tapered. And the snap ring is provided with a conical side matching the side 63'.

Figure 6:
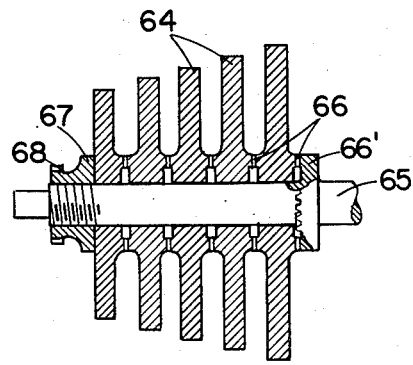

Fig. 6 shows a plurality of disks 64 rigidly connected to each other and to shaft 65 by face couplings 66 constructed according to my invention, and finished after hardening or heat treating. They are kept in tight engagement by means of a nut 67 threading onto one end of shaft 65. The teeth 68 serve for gripping the nut 67 to tighten it. Most of the shaft shown projects beyond the face surface of the teeth of coupling member 66' with which shaft 65 is formed integral, and would be impossible with conventionally ground face couplings, or with couplings cut with large rotary cutters.

Figure 7:
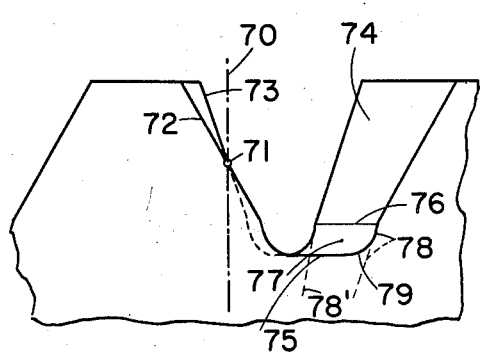
Fig. 7 is a fragmentary side view, at a larger scale, of a face coupling constructed according to the present invention, for finishing with my novel method.
Figure 8:
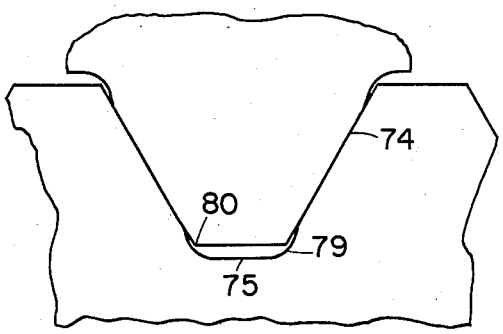
Fig. 8 is a fragmentary view showing the coupling of Fig. 7 in engagement with its mate.

Figures 7 and 8 show the tooth surfaces in a larger scale. In Fig. 7 the view is along a line radial of the coupling axis 70 and containing mean point 71. Axis 70 corresponds to the axis 33 of Fig. 1. It shows clearly how the outer profile 72, at the outer end of the teeth, is more inclined to the direction of the coupling axis 70 than the inner profile 73 at the inner end of the teeth.

The helical tooth surfaces 74 do not extend clear to the tooth bottom 75, but are relieved adjacent the tooth bottom. The relief starts at a line 76 which follows the tooth bottom. The relief surface 77 does not join the helical side surface 74 tangentially, but intersects it at a moderate angle. Its profile may be composed of a straight portion 78 and of a concave arc 79 joining the tooth bottom 75.

In accordance with my invention the relief surface 77 has an inclination or pressure angle varying lengthwise of the teeth and increasing with increasing distance from the coupling axis 70, so that the straight portion 78' at the inner end is less inclined to the direction of the coupling axis 70 than the portion 78 at the outer end. Preferably its profile inclination changes like the profile inclination of the helical side surface, so that an approximately constant angle is included between the profiles of the relief surface and of the helical surface. This angle may be quite small.

Fig. 8 shows mating tooth surfaces in engagement. The end points 80 of the teeth reach beyond the juncture of the relief surfaces with their adjacent helical side surfaces. This feature is important in the production of the coupling, and it further permits to use arcs 79 of ample radius.

Cutting face couplings

The helical tooth sides of the face coupling members may be cut prior to finishing in any known way. When projecting portions are provided, such as 48 in Fig. 3, the teeth are preferably cut by shaping or planing.

A well known shaping process cuts the helical tooth sides of face couplings with the rounded end cutting edge of a reciprocating tool. A great many cuts are required in this process to produce smooth tooth surfaces.

Figures 11, 12:
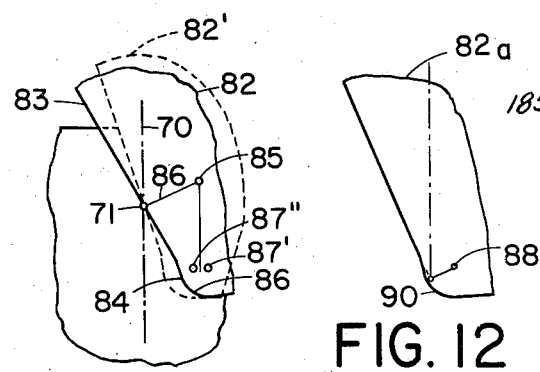
Fig. 11 is a fragmentary view taken radially of the axis of a face coupling member, and illustrating one way of cutting its helical teeth prior to the finishing operation.
Fig. 12 is a diagram illustrative of a slightly modified way of cutting.

A faster shaping process will now be outlined with Fig. 11.

The reciprocatory tool 82 has a straight side-cutting edge 83, with a slight bulge 84 at the top, for relieving the lower flank of the teeth. As the tool 82 moves in a direction radial of the coupling axis 70, it is also tipped or tilted about an axis extending in the direction of the cutting motion. It could be tipped about a radial axis passing through mean point 71. The amount of tipping should correspond to the profile inclination that changes along the length of the teeth.

The full lines show the tool 82 while it cuts near the outside end of the teeth. The dotted lines 82' show the tool near their inner end. In the full-depth position the cutting edge 83 then describes the entire helical tooth surface in one sweep, in a high-order approximation.

If $a$ denotes the profile inclination, that is the angle between the profile tangent at a mean point and the direction of the coupling axis 70, then we have the known relationship:

$$\tan a = \frac{2\pi r}{L}$$

where L is the lead of the helical surface, $r$ is the radius or distance of the mean point from the coupling axis 70, and $\pi = 3.14159$.

While the trigonometric tangent is proportional to the radius $r$, the angle $a$ itself is not exactly proportional thereto. However, as an approximation, the tipping angle can be made proportional to the tool travel. In this case the tool performs a helical motion of constant lead. A closer approximation is attained when the tool is tipped exactly according to the changing profile inclination.

Although the cutting edge is preferably kept straight in its main portion 83, it can also be made the exact intersection line of the cutting face with the helical tooth surface, at the mean radius of the coupling. In principle this would result in still higher accuracy.

In this shaping process very few cuts are required to apply the final cut shape.

Tool 82 cuts one side of the teeth. A second tool is used to cut the opposite side. This second tool is symmetrical to tool 82. It is also tipped in a direction to produce a profile inclination increasing with increasing distance from the coupling axis 70. The two side cutting tools may be used simultaneously on opposite sides of a work piece. In addition other tools may be used to take out the main stock in a conventional shaping cut without tipping.

When tool 82 is tipped or tilted about a radial axis passing through mean point 71, as it goes through the cut, it produces teeth of somewhat changing depth. This because the tool end moves up with increasing tilt. This moderate change of depth can be avoided by tipping the tool about an axis 85 also extending in the direction of the tool travel. It is parallel to the first-named direction and passes through the normal 86 of the mean tooth profile. Its distance from mean point 71 is such that axis 85 is directly in line with the mean position of the center of the arcuate end 84 of the cutting edge. The end positions of said center are indicated at 87' and 87" in Fig. 11.

With such a disposition, said center tends to move parallel to the tooth bottom, so that both end positions 87' and 87" lie in a common plane perpendicular to the coupling axis 70. A constant tooth depth results. Also it is found that the tooth surfaces so produced are moderately crowned lengthwise.

Fig. 12 shows a tool 82a identical with tool 82, but used somewhat differently. It is tipped about an axis 88 that passes through the center of the arcuate portion 90 of the tool cutting profile, also so as to follow the changing profile inclination.

In each case a pair of symmetrical tools are used to cut opposite sides of the teeth.

Finishing by abrasion

The two members of a face coupling are lapped directly with one another whenever possible. They are turned relatively to each other at a varying rate, while also effecting a depthwise motion in contact with each other. Lapping compound is admitted to the tooth surfaces. Frequent indexing is used to register different teeth with each other.

At first only the teeth, whose sides protrude laterally to the greatest extent, are in contact and are worked down. Gradually and soon the teeth equalize each other and become all alike in shape and tooth spacing, all the teeth being in contact simultaneously. The teeth are so to say fitted to each other in this process of relative motion about and along their common axis.

As will be further shown, the helical tooth surfaces are matched to each other with the least change beyond equalization, by concentrating lapping to only a part of the total depthwise displacement, to less than two thirds of the total depth. This lapping in selected positions can be accomplished in two ways, either by braking contact to avoid lapping in undesired positions, or by completely releasing the lapping pressure.

Figure 9:
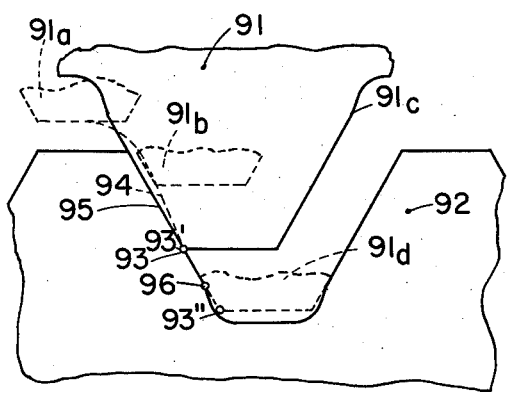
Figures 9 and 10 are fragmentary and diagrammatic views illustrating one embodiment of the finishing method of my invention.

Fig. 9 shows different positions of a face coupling member 91 in its depthwise and axial approach with respect to the mating face coupling member 92. In this approach the end point 93 describes a path 94. In the positions 91a, 91b of member 91 the two members 91, 92 are out of contact with each other, so that no lapping takes place. Contact starts in the position 91c indicated in full lines. End point 93 is then in the position 93', and the side profiles 95 of the coupling members contact each other on their full engaged depth.

From then on engagement is maintained, while the engaged side surfaces slide on each other, and while end point 93 moves to 93" at the full-depth position 91d. It reaches then beyond the point 96 where relief starts at the lower tooth flank.

Figure 10:
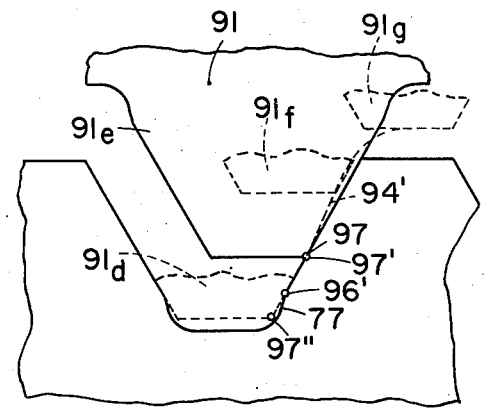

Fig. 10 shows the engagement at the opposite side of the teeth. It can be considered as showing the relative displacement of coupling member 91 with respect to coupling member 92 during the recess, away from the full-depth position 91d. Contact is maintained up to position 91e indicated in full lines. End point 97 thereby moves from 97" to 97', past point 96' where the relief surface 77 joins the helical side surface.

From then on the two coupling members separate. Coupling member 91 moves to position 91f and to position 91g, shown in dotted lines, while end point 97 describes a path 94'.

In one embodiment of the invention, that is preferred at the present time, the relative displacements shown in Figures 9 and 10 take place one immediately after the other, so that Fig. 10 is a continuation of Fig. 9. The relative turning motion of the two members is then in one direction only, and comes to a standstill in the position of closest approach of the two members, in the full-depth position.

Broadly the relative turning motion is more in one direction than in the opposite direction, so that it indexes the two members relatively to each other.

In the said preferred embodiment, one side of the teeth is worked on during the way in, Fig. 9. The other side of the teeth is worked on on the way out, away from full depth, Fig. 10. Thereafter the cycle repeats, each tooth engaging a tooth space adjacent the one engaged before. In other words, a coupling member is indexed with respect to its mate after each pass to full depth, to attain very rapid equalization of all the teeth of each member.

A modified embodiment consists in effecting helical reciprocation between the two members several times between the positions 91c and 91d before moving on. In this case indexing takes place after a plurality of lapping strokes. In both cases the abrasive engagement preferably is confined to part only of the total depth of the teeth.

The abrasive action at any one point of the tooth profiles increases with increasing relative sliding at said point, and in a limited way with increasing pressure per unit of area.

Figure 13:
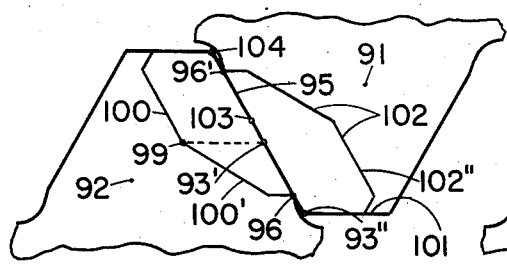
Figures 13 to 15 are fragmentary views and diagrams further explanatory of the lapping process of the present invention.

Fig. 13 illustrates relative sliding at different points of the contacting side profiles 95 of the face coupling members 91 and 92. The amount of sliding per pass is plotted laterally. Thus at point 93' of member 92 the distance 93'—99 measures the sliding. It is equal to the distance 93'—93''. As in Fig. 9, point 93' is the position up to which end point 93 of the tooth of coupling 91 remains in contact with the coupling member 92.

As point 96, where relief starts, the relative sliding is smaller. It equals the distance 96—93'', and is so plotted laterally.

At points intermediate 96 and 93' the sliding is proportionately larger than at point 96 and is defined by a straight portion 100' of graph 100.

At end point 93'' of the coupling member 91 the sliding per pass is the difference of distance 93''—93' less distance 93''—96. Point 93'' is out in the air without contact when it moves through the latter distance. Accordingly sliding at that point is equal to distance 96—93'.

Point 96 of the profile of coupling member 91 has the full amount of sliding, an amount equal to distance 93'—93''. The points further away from the tooth top 101 also have the same full amount of sliding, so that the graph 102 contains a straight portion 102'' parallel to the side profile 95. This showing continues up to point 103 of member 91. Point 103 coresponds to point 93' of member 92.

The two graphs 100, 102 are identical and merely turned around to different positions. A portion determined for one graph also represents the corresponding portion of the other graph.

Fig. 13 shows why in this abrading process the end points 93'', 104 should project beyond the points 96, 96' respectively, where the relief starts; that is why the end points should be out in the open, without contact. It is to have some sliding at the points of contact 96, 96' lowest on the tooth profiles. It insures some abrasion at all contacting points.

Figure 14:
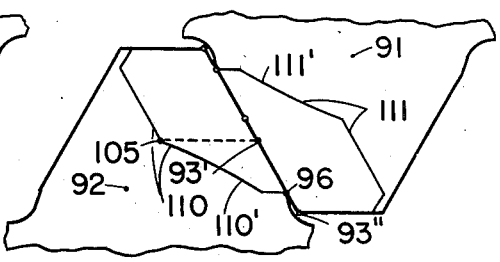

The graphs 110, 111 of Fig. 14 represent a combination of sliding and pressure for the case where the total pressure is constant in all depthwise positions of contact.

The pressure p per unit of area is then inversely proportional to the area in instantaneous contact. Thus the pressure p changes in different positions of sliding s. The graphs 110, 111 give the sum of the products $p \cdot ds$ of the instantaneous pressure and each elementary sliding component $ds$, that is $$\int pds$$

Thus distance 93'—105 is a measure of the above quantity at point 93'. This quantity can also be considered the product of sliding and an average pressure during said sliding.

The graphs 110, 111 are generally similar to the graphs 100, 102, but have concave portions 110', 111'.

Figure 15:
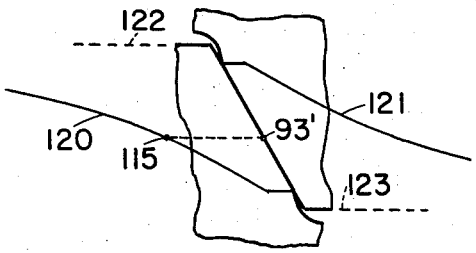

Fig. 15 illustrates the same product $\int pds$ for comparison for the case where the contact continues through the whole working depth of the teeth. At point 93' the lateral distance 93'—115 of the graph 120 is the same as distance 93'—105 of Fig. 14. But as the contact continues, there is no break in these graphs 120, 121. Together with increased sliding on the upper parts of the teeth there is also increased pressure per unit of area, because the area of contact becomes smaller and smaller as the teeth approach disengagement, and the given total pressure is distributed over a diminishing area. The extended tooth tops 122, 123 represent the asymtotes of the two graphs 120, 121 respectively.

With such an unlimited engagement the upper portions of the teeth receive far more abrasive action than the lower portions, so that the inclination or pressure angle of the side profiles is gradually changed. While this happens on both coupling members, it is preferable to confine the lapping action to an equalization rather than letting it achieve a change of tooth shape. Also lapping compound would be wasted to attain an unnecessary and undesired result. The advantage of confining the abrasive action to a portion only of the total tooth depth is therefore obvious.

The abrasive action diagrammatically described by Fig. 14 may be further equalized by varying the contact pressure at different depths of engagement. The maximum pressure is preferably kept moderate and is exerted at full-depth position, in the position of closest approach of the two members. The pressure is then decreased with increasing distance from full-depth position. In this way we can make up for the smaller sliding at point 96 at the lower end of the working profile.

A modified procedure consists in using quite small relief angles and in cutting the teeth with the relief starting at a larger distance from the tooth bottom than intended on the coupling finished by abrasion. The abrasion process then shifts the point where profile relief starts, towards the tooth bottom, taking off a minimum of metal at the lower ends of the contact profiles.

In the lapping process in accordance with the present invention the abrasive action is spread over the entire circumference. The process is therefore very rapid, especially with high speed operation. Also, because of this spread, no excessive temperatures are caused, and heat cracks are avoided. And with couplings, whose teeth only have to fit each other, the conditions are much more favorable than they would be with gears. For the tooth shape of gears has to satisfy exactly the kinematic conditions of running contact.

The lapping agent may be admitted in conventional manner suspended in a carrier, ordinarily in a liquid. When feasible it is admitted from the inside, so as to reach the inside end of the teeth first and to move outwardly along the teeth, leaving at the outside end. When it is not possible or not practical to admit the compound from the inside, it has to be admitted from areas at the outside. From there it moves to the inside and then again to the outside, to such places where it can leave.

Figure 17:
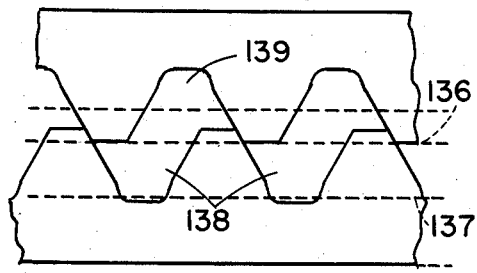
Fig. 17 is a development to a plane of the cylindrical outside surfaces of a pair of face coupling members, illustrating one way of admitting the abrasive-carrying fluid.
Figure 18:
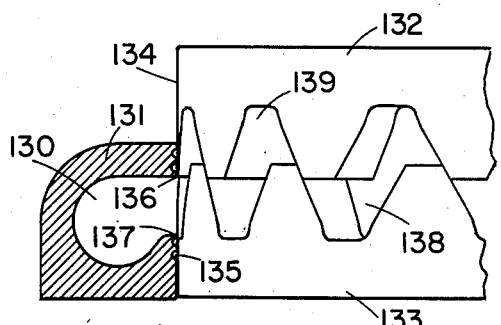
Fig. 18 is a fragmentary side view and axial section corresponding to Fig. 17.

Figures 17 and 18 indicate one way of admitting the abrasive carrying fluid from the outside. It is pumped to a channel 130 of a ring-shaped part 131 that surrounds the pair of coupling members 132, 133 and fits their cylindrical outside surface 134. Circular grooves 135 are used to reduce leakage. The compound enters the coupling teeth anywhere between the circular inside boundaries 136, 137 of channel 130. These appear as dotted straight lines in the developed view of Fig. 17.

In the position shown the compound may enter the coupling through the spaces 138, and it can escape through the spaces 139. Fluid is admitted especially in the positions away from full-depth position.

Machine

An embodiment of a lapping machine constructed according to the present invention will now be described with Figures 20 to 24. In this embodiment one member 140 of a toothed face coupling stands still, or practically stands still, in operation. The turning motion and the reciprocation are performed by the other member 141 of the coupling. The spindles are arranged vertically in this embodiment.

Member 141 is mounted on an arbor 142, and together with said arbor is rigidly chucked on a spindle 143. While a known hydraulic or pneumatic chuck is preferably used, I have shown simply a bolt 144 for securing member 141 to spindle 143. Bolt 144 threads into the end 145 of the work piece. Its head 146 rests on a split part 147 held by an end piece 148 threaded into the spindle 143. Bolt 144 has a widened cylindrical portion 150 engaging a flange 151 of end piece 148, to hold the bolt in the right direction when out of engagement with end 145.

The described construction permits to introduce the long bolt 144 from the top. After the cylindrical part 150 of the bolt has been passed from the top through both bores of end piece 148, the split part 147 is assembled on the bolt, and the two halves of this part 147 are connected to each other to move axially with the bolt. To chuck, the bolt is tightened; to dechuck it is loosened.

The spindle 143 is rotatable and axially movable in bearings 152, 153 rigid with the machine frame 154. Varying turning motion is applied to spindle 143.

A motor 160 is secured to a bracket or part 161 rigid with the machine frame 154, and drives a shaft 162 through a pair of reduction gears 163 and change gears 164. Aligned with shaft 162 is another shaft 166 carrying a fly-wheel 166' rigid therewith, and which is connected with shaft 162 through a flexible or yielding coupling 167. At its opposite end, shaft 166 carries a spur pinion 168 meshing with a face gear 170. If desired, a bevel gear pair may be used in place of the pair 168, 170.

Gear 170 is rigid with a shaft 171 and with a plate 172 that carries three circular pins 173. These successively engage a Geneva wheel 174, one pin starting when another pin leaves off. Wheel 174 and pins 173 are separately shown in Fig. 22. Accordingly the Geneva wheel 174 and shaft 175 are indexed continuously, that is in immediately succeeding motions. A new indexing motion starts right after the previous indexing motion ceases, with only an instant of stand-still in between.

The shafts 162, 166, 171 are journalled on parts 176, 177 rigidly secured to part 161 and thereby to the machine frame. Shaft 175 if the Geneva wheel is rotatably journalled in an insert 178 secured to a portion 180 of the machine frame 154.

At the lower end of shaft 175 a pinion 181 is rigidly secured thereto, and meshes with a gear 182 coaxial with spindle 143 and engaging splines 183 of said spindle. Gear 182 thus turns with spindle 143, and is either rigid therewith, or it may be axially fixed and slidable along splines 183 as the spindle 143 reciprocates along its axis.

With a six-tooth Geneva wheel 174, the tooth ratio of the pair 182, 181 should be equal to $$\frac{N}{6}$$

where N denotes the number of teeth in a coupling member.

The gears 182, 181 are change gears, changed for different numbers of teeth.

With the described disposition, the spindle 143 is turned on its axis at a varying rate. The required reciprocation along the coupling axis is derived from this turning motion. The pins 173 of the plate 172 drive the Geneva wheel 174 with a slow start and a slow stop motion, the wheel being driven from a stationary position at gradually increasing speed and then at gradually decreasing speed until it returns again to an instantaneous stationary position. The wheel stands still instantaneously as one pin 173 leaves engagement with the wheel, while another pin 173 is entering engagement and starting the indexing cycle again.

Secured to the lower end of spindle 143 by a toothed face coupling 184 is a master cam 185. The coupling 184 is held in rigid engagement by end piece 148 that threads into the spindle 143. The master cam contains a ring-shaped portion 186 of larger diameter than the coupling 140, 141. Both sides of portion 186 contain undulating cam surfaces 187, 188, each of which has as many identical undulations as there are teeth in a coupling member worked on, see also Fig. 29. The opposite cam surfaces 187, 188 engage abutments 190, 191 which, together with a spacer 192 are rigidly secured to a part 193 rigid with the machine frame 154. The opposite cam surfaces serve for positively controlling the axial motion of spindle 143 in both directions.

If desired, one of the cam surfaces 187, 188 may be left off, and replaced by means exerting axial pressure, to constrain contact at the remaining cam surface. Spring means could be used.

Figure 19:
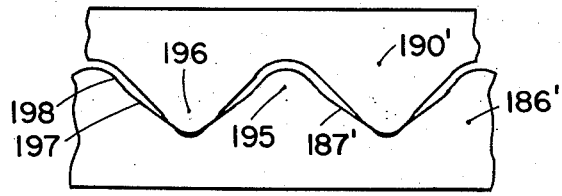
Fig. 19 is a fragmentary development of a master cam and of its abutment, showing a way of deriving axial reciprocation from the supplied varying turning motion.
Figure 23:
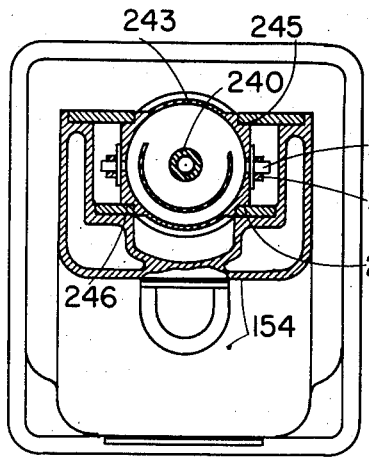
Fig. 23 is a plan view at a reduced scale of the machine shown in Fig. 20, and partly a section along line 23—23 of Fig. 20.

Fig. 19 shows one such cam surface at a larger scale. It is denoted at 187' and forms part of a plate 186'. It engages an abutment member 190', and is kept in engagement therewith by upward pressure exerted on plate 186'. The latter contains undulations or waves 195, engaging an equal number of projections or waves 196 provided on the stationary abutment member 190'. The waves 195 are related to the teeth to be lapped. They contain helical portions 197 followed by slight bulges 198 that serve to move the helical side surfaces of the coupling members away from each other in the required position, thereby to disrupt the abrasive contact.

The larger diameter of the master cam as compared with the coupling causes the sides 197 to be less inclined to the peripheral direction than the sides of the coupling teeth, so that a smooth action is attained in deriving the axial reciprocation of the spindle 143 from its varying rotation.

Uniform rotation of the spindle 143 is practically impossible, as it would result in infinite accelerations and loads in the full-depth position, where both sides are simultaneously in contact.

With the varying rotation in accordance with the present invention the accelerations and inertia loads are kept within practical limits.

Dynamic mass balance

Operation at high speed is made possible by dynamic mass balance. In accordance with the present invention both the inertia loads due to reciprocation and the inertia moments are balanced. These moments are caused by the varying rotation about the axis of spindle 143 and to a lesser extent about shaft 175.

The mass-balance member 200 is preferably arranged in coaxial relationship with spindle 143. It comprises an internal gear 201 with flange 202 that may have openings 203 to reduce its weight. A removable disk 204 is rigidly secured to flange 202, and permits to change the moment of inertia for different jobs. The gear 201 is rotatably mounted between a hub part 205 and a disk 206 rigidly secured thereto. The hub part does not rotate, but is movable axially of spindle 143, along a stationary pin 207 with key 208.

The hub part 205 preferably contains three spokes, one of which is shown at 210. Pivotally attached at 211 to the outer end of each spoke is a link 212, whose other end 213 is pivotally attached to a lever 214. This lever is mounted for rocking motion on a pin 215 that is held in projecting ears 216 of the machine frame. The opposite end 217 of lever 214 contains a part 218 adapted to tilt in the end 217. This part engages a disk 220 coaxial with spindle 143 and secured to rotate therewith. Snap rings 221 hold the disk 220 in axial direction.

As the spindle 143 reciprocates, disk 220 is moved along with it and compels lever 214 to rock on its pin 215. Link 212 is thereby moved in opposite direction as compared with disk 220, at the desired ratio controlled by the leverages of the ends 213 and 217 with respect to pin 215.

Preferably the link 212 is made to move at a slower rate than the disk 220. While such a disposition requires proportionately more mass for balancing, it is known to store up and require less energy.

Thus a mass-balance member moving at half a given speed requires double the mass of a member moving at said given speed; but stores up only half as much energy.

While only one lever 214 and link 212 are visible in the view of Fig. 20, three of them are preferably used, each link being attached to a spoke 210. They are uniformly spaced about the spindle 143. The links move all in the same direction, and displace the hub part 205 axially. They reciprocate it in a direction opposite to the reciprocation of disk 220. And with the hub part goes also the gear 201 and the parts connected with it.

The reciprocation of the mass-balance member is only small, in the instance illustrated only half of the reciprocation of spindle 143, and less than the depth of the coupling teeth worked on.

Gear 201 is rotated in the opposite direction as compared with spindle 143, and through smaller angles, by gears 225, 226 rigidly connected by a shaft 227. These gears and shaft are shown in dotted lines to indicate that they are not in the drawing plane, but are in a position displaced therefrom about the axis of spindle 143. Preferably two sets are used.

Gear 225 meshes with teeth 183 provided on spindle 143. These teeth are also used as splines for connecting gear 182 to said spindle. The gears 225, 226 with shaft 227 are rotatably mounted in an axially fixed position on the machine frame. Recesses are provided in the flanges of the abutments 190, 191 and in spacer 192 to provide clearance for the shafts 227. Gear 226 meshes with the internal gear 201.

With this arrangement the internal gear 201 turns oppositely from spindle 143. It has a smaller angular velocity and requires a larger moment of inertia for mass balance. But again it stores up and requires less energy than spindle 143 and the parts connected with it.

It should be noted that the opposite reciprocation required for mass balance is derived from the spindle 143 itself; and that the opposite rotation of the mass balance member is also derived from this spindle.

With all around mass balance the abrading process can be performed at high speed, so that the production is multiplied.

*Torque equalization*

A useful optional feature will now be described.

Due to the accelerations and decelerations rapidly following each other, the pins 172 alternately drive the Geneva wheel 174 and are driven thereby. Likewise the pinions 168, 181 alternately drive and are driven in rapid succession.

To avoid or reduce vibration and chatter I may provide means for reducing or eliminating the rapid torque reversals. The means illustrated comprise an electromagnet.

A stationary coil or solenoid 230, fed by an adjustable direct electric current, tends to create a magnetic circuit in a stationary split outer ring 231 and in a hub portion 232 rigid with gear 182 and with spindle 143. Both ring 231 and portion 232 are made of armature iron. The elements of this magnetic circuit lie in axial planes of spindle 143. Portion 232 (Fig. 21) contains as many straight notches 233 as there are teeth in a work piece. The split ring 231 contains similar notches 234 on its inside surface, also extending parallel to the axis 143' of spindle 143. Teeth are formed by the notches on portion 232 and on ring 231.

In the turning position of the spindle where said teeth of portion 232 are aligned with the teeth of ring 231, magnetic resistance is smallest and maximum circuit intensity is possible. When however the teeth of one are aligned with the notches of the other, as indicated in Fig. 21, the magnetic resistance is largest and the circuit intensity is much smaller. This showing is known to result in a tendency to turn the hub portion 232 into alignment with the teeth of the ring 231, so that their tooth ends are aligned with each other.

Accordingly we have here means for producing a rapid torque variation and torque reversal.

The work pieces are set up so that the said aligned position of the teeth corresponds to a similarly aligned position of the coupling teeth, that is to the mid-position of indexing. The coupling teeth are then out of engagement with each other. The full-depth position of the coupling members corresponds to the position shown in Fig. 21.

As the spindle 143 moves through mid-indexing position at its maximum speed, the magnetic circuit tends to keep it there. It decelerates the spindle as soon as it has passed the said mid-position. And before reaching mid-position the magnetic circuit draws the spindle towards said mid-position and accelerates it.

These accelerations and decelerations otherwise would have to be provided wholly by the gears and the Geneva wheel. It is seen then that the described magnetic circuit may greatly relieve the drive, and mitigate or eliminate the rapid torque reversals therein.

*The stationary part*

Face coupling member 140 is secured to a spindle 240 (Fig. 20) that is practically stationary in operation. A magnetic chuck, diagrammatically indicated at 241, is rigidly secured to a flange 242 of spindle 240. The coupling member 140 may be centered by setting it on the teeth of its mate 141. The drum 243 which carries spindle 240 is then moved down axially. The chuck is actuated when in contact with member 140, and then holds it with sufficient rigidity for lapping.

It should be understood that member 140 could also be chucked in any other suitable known way.

For loading and unloading the drum 243 is raised. It is moved along straight guide surfaces 245, 246, also seen at a smaller scale in Fig. 23. On its side it contains a pair of coaxial pivot pins 247, engaged by a pair of links 248. At their opposite ends the links 248 are pivotally connected to a forked lever 250 (Fig. 20) mounted on a stationary pivot 251. The latter is held in the machine frame.

The lever 250 can be turned on its pivot 251 by a hydraulic piston 252 movable in a cylinder 253 rigidly secured to the machine frame 154. A circular rod 254 is rigidly connected to the piston 252, and its enlarged upper end 255 engages straight guideways 259 rigidly connected to the machine frame. A link 256 is pivotally attached to end 255 and to the end 257 of lever 250. It is adjustable in length by such known means as a rod 260 with hexagonal head. The rod 260 contains threads 261, 262 of opposite hand on its opposite ends, that engage matching internal threads provided in the end parts 263, 264 of link 256. The rod is secured against rotation in any suitable known manner not indicated in the drawing.

It is seen that downward movement of piston 252 lowers the end 257 of lever 250 and raises its forked end, thereby moving the drum 243 upwardly along the guide surfaces 245, 246. In its low position, that is in its working position, it is kept pressed against an adjustable stop of known construction, not visible in Fig. 20. The hydraulic operation itsself is known and needs no description here.

With the design illustrated, the stroke of the piston 252 should be large enough to permit loading and unloading of the range of work for which the machine is designed.

Spindle 240 contains straight splines 266 at its upper end, that engage matching splines provided in a part 267. This part is rigidly secured to the end plate 268 of drum 243, and can be adjusted thereon about the axis of spindle 240.

The spindle 240 is thus free to move axially along splines 266 a slight amount. A nut 270 engaging a thread 271 of spindle 240 provides an adjustable stop for the downward motion of spindle 240 in drum 243. At the lower end a cylindrical rim 272 of spindle 243 engages the cylindrical inside surface of an insert 273 secured to the drum 243, and is axially slidable therein.

The abrading pressure is controlled by an axial load acting on spindle 240, up to the point where the nut 270 stops all axial displacement. Sometimes the weight carried by spindle 240 provides the desired pressure. If the weight of spindle 240 and of the parts carried thereby is too large, a Belleville-type disk spring 275 may be used to carry part of the weight. The outer circumference of this spring rests on a snap ring 276 engaging an internal circular groove provided on drum 243. Its inner circumference engages a snap ring 277 applied to a groove of spindle 240.

When a larger pressure is desired than supplied by the weight of the parts, a disk spring similar to spring 275 may be positioned to exert pressure in the opposite direction, downwardly, to add to the weight. Such a spring is indicated in dotted lines 278.

In operation, the coupling member 141 exerts pressure on the coupling member 140 directed nearly perpendicular to the side surfaces of the coupling teeth. The torque component is taken up by the splines 266. The axial upward component of this load is equal to the downward pressure caused by the weight and modified by the spring means used, such as spring 275 or 278. Thus the contact pressure is proportional to said downward pressure and can be controlled therewith.

A slight addition to the machine structure permits to vary this pressure during the abrading passes, so as to effect more pressure at and near full-depth position than in the positions further away therefrom. This addition is indicated in Fig. 27. It comprises a flanged ring 280 rigidly secured to the end plate 268 of drum 243 (Fig. 20) with the same screws 281 that also bolt the end plate to the drum. A spring 282 is secured to the top portion of ring 280. It is shown as a disk spring. It carries a button 283 engaged by a roller 284 of a lever 285. Lever 285 is pivotally mounted at 286 on a bracket 287 secured to ring 280 and to drum 243. Its opposite end carries a roller 290 engaged by a face cam 291 from below. The cam 291 is secured in a fixed but adjustable axial position to a vertical shaft 292 which is rotated in time with shaft 166 containing fly-wheel 166'.

In operation, the cam 291 tilts lever 285 in each tooth cycle, so that it is tilted the most in the full-depth position of the coupling members worked on. It thereby applies a varying deformation to spring 282, and exerts varying downward pressure which is largest in the full-depth position. The abrading action is thereby increased in and adjacent this position.

When such additional structure is used, the added downward pressure should be allowed for in determining the spring 275 supporting spindle 240.

The lapping compound preferably consists of abrasive suspended in a liquid, as usual, and the structure illustrated corresponds to the use of a liquid. Abrasive might however also be admitted by air instead.

A centrifugal pump may be used for moving this liquid compound. It is arranged coaxial with motor 160 and diagrammatically indicated at 300. The pump receives its supply from a sump 301, Fig. 24, and forces it along a conduit 302 to the inside of drum 243 (Fig. 20), into a rubber-like bag 303. This bag is tightly secured at its open lower end to the flange 242 of spindle 240, by means of a ring-shaped disk 304 and screws 305. These are the same screws that also hold the magnetic chuck 241. The compound then enters through holes 306 of spindle 240 to the space 307 on the inside of the coupling teeth. From there it moves outwardly through the tooth spaces of the coupling members, helped along by centrifugal inertia force. It collects in a circular recess 310 formed in a part 311 rigidly secured to the machine frame 154, and flows through pipes to the sump 301 shown in Fig. 24.

A large sump is used, so that from time to time part of its content can be drawn off without hampering machine operation. The part drawn off is collected and separated into abrasive matter and abraded material, such as tiny particles of steel, through their difference in specific gravity. The abrasive matter is dried, if that was not already done, and is then separated into used up and into operative material. The used up material has lost its sharp edges and is more apt to roll, so that it has less frictional resistance, a property which may be used for separation.

Figure 16:
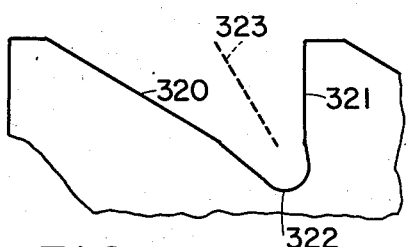
Fig. 16 is a fragmentary side view of a saw-tooth clutch such as may also be finished after hardening with my method.

The machine as described can also be used for lapping other kinds of couplings, whose tooth sides contain constant longitudinal profiles in planes perpendicular to their axis, even when the two sides of the teeth are unequally inclined to the direction of said axis. The saw-tooth clutch or starter jaw fragmentarily indicated in Fig. 16 is one such application. As on the described fixed type couplings, the two sides 320, 321 converge towards the tooth bottom 322. Side 320 is a helical surface, and the driving side 321 is a plane containing the clutch axis.

For couplings or clutches of the kind shown in Fig. 16, gear 182 of spindle 143 (Fig. 20) is maintained in an axially fixed position, and the straight splines 183 and 266 are replaced by helical splines. These have the same hand of helix as the sides 320 and a lead angle intermediate the lead angles of the two sides 320, 321, at the same diameter; a lead angle which may correspond to the dotted line 323. The lead angle at the given diameter determines the lead in known manner, that should be used on the splines at 183 as well as at 266. Axial pressure exerted on the spindle 240 then tends to move the spindle helically down, rather than straight down, so that the teeth of coupling member 140 tend to move towards member 141 in a direction inclined to both sides of its teeth. Furthermore, the master cam produces a helical reciprocation that is superimposed to the varying turning motion of gear 182.

With the above described substitution, the operation is the same as has been described for face couplings having opposite helical tooth sides of equal inclination.

It should be noted that axial pressure causes abrasive pressure successively on both sides of the teeth. No reversal of pressure or of torque is required to maintain the two sides successively in contact.

The machine may be run in one direction only, or successively in opposite directions. On machines intended to run in one direction of rotation only, the splines 266 (Fig. 20) may be made slightly helical, to allow for the opposite effect of friction on the two sides, thereby to attain more closely equalized working pressures on opposite sides having equal profile inclination.

Also I may use balls to minimize friction in said splines.

Modifications

A modified embodiment will now be described with Figures 25 and 26.

In this embodiment a plurality of lapping passes are used on contacting tooth sides before changing the registry of the teeth, that is, before indexing. Here preferably one side of the teeth is completely lapped before the other side is started on. As in the above described embodiment the lapping is preferably confined to a depthwise displacement less than two thirds of the tooth depth. That is, the lapping strokes, exclusive of indexing, are smaller than two thirds of the tooth depth.

The same general arrangement may be used as shown in Fig. 20, except for a modified drive to the pinion 181 that is coaxial with the Geneva wheel 174. Shaft 366 of Fig. 26 corresponds to shaft 166 of Fig. 20.

The Geneva wheel 374 is operated by a single pin 373 of a plate 372. When the pin 373 is out of engagement with a slot 379, the Geneva wheel is locked by means of a pawl 400 (Fig. 25). This pawl engages one of the notches 401 provided in the Geneva wheel, and is kept in engagement therewith by a spring 402. When pin 373 is about to enter a slot 379, the pawl 400 is lifted from its notch 401 by a cam track 403 provided on the outside of plate 372. The cam track acts on a roller 404 mounted on an arm rigid with pawl 400. At the end of the engagement between the pin 373 and the Geneva wheel, the cam track 403 lets the pawl 400 move into a new notch under the urge of spring 402.

Shaft 366 drives a vertical shaft 406 through a pair of miter gears 407. And shaft 406 drives the plate 372 through a pair of spur gears 408.

The drive from the Geneva wheel 374 to the pinion 381 is through a pair of coaxial shafts 375', 375" journalled on one another and at 410 and 411 adjacent the Geneva wheel and pinion 381. Shaft 375' is rigid with or formed integral with the Geneva wheel, while pinion 381 is rigidly connected to shaft 375". The pinion 381 meshes with a gear 382 shown fragmentarily that is coaxial with the spindle 143 shown in Fig. 20, and drives it.

The two coaxial shafts 375',; 375" contain helical splines or teeth 412, 413 of opposite hand. These are engaged by a sleeve 414 having internal splines or teeth matching the splines 412, 413. The sleeve 414 is enclosed and held by a slide 415 of the form of an outer sleeve, that is angularly fixed but movable axially. On one end it contains straight teeth 416 engaged by straight teeth provided in a stationary part 417. Slide 415 contains radial projections 418 forming bearing journals for rollers 420. These rollers engage cam tracks provided in a split rotary member 421 which is axially fixed. Member 421 is rotated by a gear 422 rigid with shaft 406 and meshing with teeth 423 provided on member 421.

As member 421 rotates at a uniform rate, its built-in cam reciprocates the slide 415 a plurality of times per turn, thereby also reciprocating sleeve 414 which may turn inside of slide 415. This reciprocation causes the shaft 375" to oscillate with respect to shaft 375'. The work holding spindle 143 (Fig. 20) is thereby also oscillated through the gears 381, 382, and thereby also reciprocated by master cam 185. Accordingly a plurality of abrading passes of the desired length take place between indexing motions effected by Geneva wheel 374.

A further embodiment will now be outlined with diagram Fig. 28. This embodiment dispenses with a master cam. One coupling member is maintained completely stationary, for instance the upper member when the axis is vertical. Spring means press the mating member upwardly, towards the stationary coupling member. In the positions of approaching disengagement the spring pressure is made to increase sharply with increasing distance from full-depth position. This method can be performed on the machine shown in Fig. 20, when the master cam 185 is omitted and is replaced by a spring that presses the work spindle 143 upwardly. The spindle 240 of the upper member is then locked completely, as by inserting a spacer between the snap ring 277 and the end plate 268, and tightening nut 270. In addition, the indexing motion is modified, as described below.

When the helical tooth sides are in contact, the axial acceleration is proportional to the angular acceleration provided by the indexing motion. It can be controlled by selecting a suitable indexing motion. The working pressure at the contacting tooth surfaces is caused by the inertia load due to acceleration or deceleration and by the said spring pressure. The effect of the latter is obvious and needs no explanation.

The working pressure increases with increasing acceleration in the downward stroke, away from full-depth position, and with increasing deceleration in the upward stroke. To concentrate the abrasive action to only a part of the total travel, adjacent the full-depth position, an indexing motion may be used as indicated in Fig. 28. This figure is a velocity diagram of one cycle in terms of the turning angle of the driver. Thus ordinate 430 of point 431 is a measure of the turning velocity of the Geneva wheel at a turning angle of driving shaft 166 corresponding to the abscissa at said point. Acceleration and deceleration are concentrated near the ends 432, 433 of the indexing cycle shown, so that abrasive action is concentrated in the positions adjacent full-depth position, that correspond to said ends. The indexing cycles follow each other immediately.

An indexing motion corresponding to the diagram Fig. 28 may be attained in various ways, for instance by driving the plate 172 having pins 173 (Fig. 20) at a varying rate, so that the motion of the Geneva wheel 174 is modified in the desired way. The drive consisting of spur pinion 168 and face gear 170 is then made a varying ratio drive, the pinion being made longer and the face gear being modified.

In the specification and drawings I have either omitted or left undiscussed such obvious and known items as guards and seals, and other obvious matter, as not forming part of the invention proper.

Further modifications may be made.

The process may also be used with shaving tools, having thin lands extending lengthwise of the teeth.

Also while I have described a machine for processing a single face coupling at a time, it is obvious that multiple-spindle machines could be made, for simultaneously processing a plurality of couplings.

This application is intended to cover any variations, uses, or adaptations of the invention following, in general, the principles of the invention and including such departures from the present disclosure as come within the known or customary practice in the art to which the invention pertains and as may be applied to the essential features herein set forth and as fall within the scope of the invention or the limits of the appended claims.

Having thus described my invention, what I claim is:

1. The method of finishing a toothed face coupling member and the like that has teeth already formed, said teeth being equally spaced about an axis and having side surfaces of constant profile shape in parallel planes perpendicular to said axis, which comprises mounting said toothed face coupling member and a counterpart member adjacent each other with their axes coinciding, effecting relative turning motion between said two members about their common axis at a varying rate, effecting relative reciprocation between said two members along said axis towards and away from a position of full-depth meshing engagement of their teeth during said relative turning motion and while the side surfaces of said members are in contact with each other, said relative turning motion coming to a stand-still, approximately, in the position of closest approach of said two members and at other times providing a relative indexing motion.

2. The method of finishing a pair of toothed face coupling members and the like that have teeth already formed, the teeth of each member being equally spaced about an axis and having helical side surfaces, which comprises mounting the two members of the coupling adjacent each other with their axes coinciding, effecting relative turning motion between said two members about their common axis at a varying rate, effecting relative reciprocation along said axis towards and away from a position of full-depth meshing engagement of their teeth during said relative turning motion and while the side surfaces of said members are in contact with each other, said relative turning motion coming to a stand-still, approximately, in the position of closest approach of said two members and at other times providing a relative indexing motion, so that each tooth of one coupling member successively gets into contact with all the teeth of the other coupling member.

3. The method of finishing a toothed face coupling member and the like that has teeth already formed, said teeth being equally spaced about an axis and having helical side surfaces, which comprises mounting said toothed face coupling member and a counterpart member adjacent each other with their axes coinciding, maintaining one of said members angularly stationary, rotatably indexing the other member repeatedly with an instant between each indexing motion in which said other member stands still so that after each indexing motion said other member comes for an instant to a stand-still and then a new indexing motion starts, effecting relative reciprocation between said two members along their common axis towards and away from a position of full-depth meshing engagement of their teeth during said rotary indexing motion while the side surfaces of said members are in contact with each other, said stand-still corresponding to said full-depth position.

4. The method of finishing a toothed face coupling member and the like that has teeth already formed, said teeth being equally spaced about an axis and having helical side surfaces, which comprises mounting the two members of said toothed face coupling adjacent each other with their axes coinciding, admitting an abrasive-carrying fluid to their teeth, indexing said two members relatively to one another repeatedly with an instant between each indexing motion so that after each indexing motion the two members come for an instant to a relative stand-still and then a new indexing motion starts, effecting relative reciprocation between said two members along their common axis towards and away from a position of full-depth meshing engagement of their teeth during said indexing motion while the side surfaces of said members are in contact with one another, said stand-still coinciding with said full-depth position, and exerting axial pressure between said two members.

5. The method of finishing a toothed face coupling member and the like that has teeth already formed, said teeth being equally spaced about an axis and having side surfaces of constant profile shape in parallel planes perpendicular to said axis, which comprises mounting said toothed face coupling member and a counterpart member adjacent each other with their axes coinciding, effecting relative turning motion between said two members about their common axis at a varying rate, effecting relative reciprocation between said members along said axis towards and away from a position of full-depth meshing engagement of their teeth during said turning motion while the side surfaces of the teeth of said members are in contact with one another at least through part of said reciprocation, said relative turning motion coming to an approximate stand-still in the position of closest approach of said two members, and effecting dynamic mass balance both for inertia loads due to reciprocation and for inertia moments due to the varying turning motion.

6. The method of finishing a toothed face coupling member and the like that has teeth already formed, said teeth being equally spaced about an axis and having side surfaces of constant profile shape in parallel planes perpendicular to said axis, which comprises mounting said toothed face coupling member and a counterpart member adjacent each other with their axes coinciding, effecting relative turning motion between said two members about their common axis at a varying rate, effecting relative reciprocation between said members along said axis towards and away from a position of full-depth meshing engagement of their teeth during said turning motion while the side surfaces of the teeth of said members are in contact with one another at least through part of said reciprocation, said relative turning motion coming to an approximate stand-still in the position of closest approach of said two members, said reciprocation being derived from said varying turning motion.

7. The method of finishing a toothed face coupling member and the like that has teeth already formed, said teeth being equally spaced about an axis and having side surfaces of constant profile shape in parallel planes perpendicular to said axis, which comprises mounting said toothed face coupling member and a counterpart member adjacent each other with their axes coinciding, effecting relative turning motion between said two members about their common axis at a varying rate, effecting relative reciprocation between said members along said axis towards and away from a position of full-depth meshing engagement of their teeth during said turning motion while the side surfaces of the teeth of said members are in contact with one another at least through part of said reciprocation, said relative turning motion coming to an approximate stand-still in the position of closest approach of said two members, and admitting abrasive-carrying fluid to the teeth of said members from the inside outwardly.

8. The method of finishing a toothed face coupling member and the like that has teeth already formed, said teeth being equally spaced about an axis and having side surfaces of constant profile shape in parallel planes perpendicular to said axis, which comprises mounting said toothed face coupling member and a counterpart member adjacent each other with their axes coinciding, effecting relative turning motion between said two members about their common axis at a varying rate, effecting relative reciprocation between said members along said axis towards and away from a position of full-depth meshing engagement of their teeth during said turning motion with the side surfaces of said teeth in engagement with one another at least through part of said reciprocation, said relative turning motion coming to an approximate stand-still in the position of closest approach of said two members, and periodically changing the contact pressure between said two members in each reciprocation cycle whereby the largest pressure is applied adjacent said position of closest approach.

9. The method of finishing a toothed face coupling member and the like that has teeth already formed, said teeth being equally spaced about an axis and having side surfaces of constant profile shape in parallel planes perpendicular to said axis, which comprises mounting said toothed face coupling member and a counterpart member adjacent each other with their axes coinciding, effecting relative turning motion between said two members about their common axis at a varying rate, effecting relative reciprocation between said members along said axis towards and away from a position of full-depth meshing engagement of their teeth during said turning motion, said relative turning motion coming to an approximate stand-still in the position of closest approach of said two members, said members being maintained with their tooth surfaces in working contact during axial motion through a distance smaller than two thirds of the depth of the coupling teeth in a region including said position of closest approach.

10. The method of finishing a pair of toothed face coupling members and the like that have teeth already formed, said teeth being equally spaced about an axis and having helical side surfaces, which comprises mounting the two face coupling members adjacent each other with their axes coinciding, holding one of said members against rotation, repeatedly indexing the other of said members on its axis so that after each indexing motion said other member comes for an instant to an approximate stand-still and then a new indexing motion starts, effecting relative reciprocation between said members along said axis towards and away from a position of full-depth meshing engagement of their teeth during said indexing motion, whereby said stand-still position coincides with the position of closest approach of said two members, admitting abrasive to the teeth of said members, and limiting the working contact of said members to a depthwise relative displacement of less than two thirds of the depth of the coupling teeth, said displacement including said position of closest approach.

11. The method of finishing a toothed face coupling member and the like that has teeth already formed, said teeth being equally spaced about an axis and having helical side surfaces, which comprises mounting said toothed face coupling member and a counterpart member adjacent each other with their axes coinciding, effecting relative indexing motion between said two members about their common axis repeatedly so that after each indexing motion said two members are for an instant approximately at a relative standstill and then a new indexing motion starts, effecting relative reciprocation along said axis between said two members towards and away from a position of full-depth meshing engagement of their teeth whereby said stand-still position coincides with the position of closest approach of said two members, while effecting contact on one side of the coupling teeth on the way in towards full-depth position and on the opposite side of said teeth on the way out from full-depth position.

12. The method of finishing a toothed face coupling member and the like that has teeth already formed, said teeth being equally spaced about an axis and having helical side surfaces, which comprises mounting a toothed face coupling member and a counterpart member adjacent each other with their axes coinciding, admitting abrasive to said teeth, effecting relative helical reciprocation between said two members about and along their common axis towards and away from a position of full-depth meshing engagement of their teeth with their teeth in abrasive contact with one another, said helical reciprocation having an axial length less than two thirds of the depth of the coupling teeth, and in periodically indexing one of said members with respect to the other.

13. Apparatus for finishing toothed face couplings and the like that have teeth already formed, comprising a pair of supports, means for securing two toothed face members to said supports in coaxial relationship, means for rotatably mounting at least one of said supports, means for turning said one support on its mounting means at a varying rate so that its turning motion comes to an approximate stand-still at spaced instants, and means operated by said turning motion for reciprocating one of said supports along the axis of said turning motion.

14. Apparatus for finishing toothed face couplings and the like that have teeth already formed, comprising a pair of supports adapted to receive and hold two toothed face members in coaxial relationship, means for rotatably mounting at least one of said supports, means for turning said one support on its axis at a varying rate so that its turning motion comes to an approximate stand-still at spaced instants, means for reciprocating one of said supports along said axis, and mass-balance means containing a member rotatable about an axis having the same direction as the first-named axis, said mass-balance means including means for accelerating the last-named member about said axis in a direction opposite to the accelerations of said one support about its axis.

15. Apparatus for finishing toothed face couplings and the like that have teeth already formed, comprising a pair of supports, means for securing two toothed face members to said supports in coaxial relationship, means for rotatably mounting at least one of said supports, means for turning said one support on its mounting means at a varying rate so that its turning motion comes to an approximate stand-still at spaced instants, cam means for reciprocating one of said supports along the axis of said turning motion, said cam means comprising a cam rigidly secured to said one support and a cooperating stationary abutment.

16. Apparatus for finishing toothed face couplings and the like that have teeth already formed, comprising a pair of supports, means for securing two toothed face members to said supports in coaxial relationship, means for rotatably mounting at least one of said supports, means for repeatedly indexing said one support about its axis of rotation so that after each indexing motion said one support comes approximately to a stand-still before a new indexing cycle starts, and means operated by said indexing motion for reciprocating one of said supports along its axis.

17. Apparatus for finishing toothed face couplings and the like that have teeth already formed, comprising a pair of supports adapted to receive and hold two toothed face members in coaxial relationship, means for rotatably mounting at least one of said supports, means for indexing said one support so that a new indexing cycle starts right after the previous indexing cycle ceases and comes for an instant to an approximate stand-still, means for reciprocating one of said supports along its axis in time with said indexing motion for part of the distance travelled, and means for exerting torque on said indexed support alternately in opposite directions, there being one torque cycle per indexing cycle.

18. Apparatus for finishing toothed face couplings and the like that have teeth already formed, comprising a pair of supports adapted to receive and hold two toothed face members in coaxial relationship, means for mounting one of said supports for motion about and along an axis coinciding with the axis of said face members, means for turning said one support on its axis at a varying rate so that its turning motion comes to an approximate stand-still at spaced instants, means for reciprocating said one support along its axis, a mass-balance member disposed in axial alignment with said supports, and means for turning said mass-balance member about an axis coinciding with the axis of said one support and for moving it along said axis.

19. Apparatus for finishing toothed face couplings and the like that have teeth already formed, comprising a pair of supports adapted to receive and hold two toothed face members in coaxial relationship, means for mounting one of said supports for motion about and along an axis coinciding with the axis of said face members, means for indexing said one support on its axis so that a new indexing cycle starts right after the previous indexing cycle ceases and comes for an instant to an approximate stand-still, means for reciprocating said one support along its axis, in time with said indexing motion for part of the distance travelled, and means for exerting varying axial pressure on the other support in time with said cycles.

20. Apparatus for finishing toothed face couplings and the like that have teeth already formed, comprising a pair of supports, means for securing two toothed face members to said supports in coaxial relationship, means for mounting one of said supports for motion about and along an axis coinciding with the axis of said face members, a shaft rotatably mounted in an axially fixed position, means for oscillating said shaft, means connected to said shaft for helically reciprocating said one support, and means for periodically indexing said one support.

21. A toothed face coupling for rigidly connecting two members, comprising interengaging teeth provided on the side faces of said two members, the teeth of each member being equally spaced about an axis and extending in directions radial of said axis, the contacting side surfaces of the teeth of said members having profile inclinations increasing with increasing distance from said axis, opposite side surfaces of said teeth being helical surfaces of opposite hand coaxial with said axis, and threaded means for maintaining said coupling members in engagement under pressure.

22. A toothed face coupling for rigidly connecting two members, comprising interengaging teeth provided on adjacent side faces of said members, the teeth of each member being equally spaced about an axis and extending in directions radial of said axis, the contacting side surfaces of said teeth having profile inclinations increasing with increasing distance from said axis, opposite side surfaces of said teeth being helical surfaces of opposite hand coaxial with said axis, said teeth having receding fillet surfaces connecting their side surfaces with the tooth bottoms, so that the helical side surfaces of the mating teeth reach beyond the start of said fillet surfaces without contact beyond, said fillet surfaces having profile inclinations increasing with increasing distance from said axis, and threaded means for maintaining said members in engagement under pressure.

23. A toothed face coupling for rigidly connecting two members, comprising interengaging teeth provided on adjacent side faces of said members, the teeth of each member being equally spaced about an axis and extending in directions radial of said axis, the contacting side surfaces of said teeth having profile inclinations increasing with increasing distance from said axis, oppposite side surfaces of said teeth being helical surfaces of opposite hand coaxial with said axis, one of said members having a portion projecting beyond the extended face surface of its teeth, the outside surface of said portion having a smaller distance from the axis of its member than the inner ends of said teeth so as to leave a space between said inner ends and said portion, and threaded means for maintaining said members in engagement under pressure.

24. Apparatus for finishing toothed face couplings and the like that have teeth already formed, comprising a pair of supports, adapted to receive and hold two toothed face members in coaxial relationship, means for mounting one of said supports for rotation about an axis coinciding with the axis of said two face members, indexing means for turning said one support on its axis at a varying rate so that its turning motion comes to an approximate stand-still periodically, said indexing means comprising a rotary actuating member having a plurality of identical projections equi-angularly spaced about its axis and a rotatable member having a plurality of ways adapted to be engaged by said projections, and means for reciprocating one of said supports along the first-named axis.

25. Apparatus for finishing toothed couplings and the like that have teeth already formed, comprising a pair of supports adapted to receive and hold two toothed face members in coaxial relationship, means for mounting one of said supports for rotation about an axis coinciding with the axis of said two face members, indexing means for turning said one support on its axis at a varying rate so that its turning motion comes to an approximate stand-still periodically, said indexing means comprising a rotary actuating member having a plurality of identical projections equi-angularly spaced about its axis and a rotatable Geneva-type member having a plurality of straight radial ways adapted to be engaged by said projections, and cam means for reciprocating one of said supports along the first-named axis, said cam means comprising a cam rigidly secured to the last-named support and a relatively stationary, cooperating abutment.

26. Apparatus for finishing toothed face couplings and the like that have teeth already formed, comprising a pair of supports adapted to receive and hold two toothed face members in coaxial relationship, means for mounting one of said supports for turning motion about an axis coinciding with the axis of said two face members, means for imparting motion about and along said axis to said one support, means for maintaining the other of said supports angularly stationary and without turning motion in any one axial position within operating range, spring means for exerting pressure on said other support in the direction of said axis, and a stop for limiting the axial displacement of said other support.

References Cited in the file of this patent

UNITED STATES PATENTS

| | | |
|---|---|---|
| 340,156 | Richards | Apr. 20, 1886 |
| 729,432 | Sidway et al. | May 26, 1903 |
| 918,014 | Cooper | Apr. 13, 1909 |
| 1,586,990 | Harrison | June 1, 1926 |
| 1,858,568 | Wildhaber | May 17, 1932 |
| 2,003,844 | Tintner | June 4, 1935 |